United States Patent
Schmid et al.

(10) Patent No.: US 7,806,056 B2
(45) Date of Patent: Oct. 5, 2010

(54) MAGNET BLOCK FOR A MAGNETIC LEVITATION TRANSPORT SYSTEM AND METHOD FOR THE PRODUCTION THEREOF

(75) Inventors: Robert Schmid, Neunkirchen am Brand (DE); Benno Weis, Hemhofen (DE)

(73) Assignee: Siemens Aktiengesellschaft, Munich (DE)

( * ) Notice: Subject to any disclaimer, the term of this patent is extended or adjusted under 35 U.S.C. 154(b) by 706 days.

(21) Appl. No.: 11/663,598

(22) PCT Filed: Sep. 19, 2005

(86) PCT No.: PCT/EP2005/054640
§ 371 (c)(1),
(2), (4) Date: Mar. 23, 2007

(87) PCT Pub. No.: WO2006/032639
PCT Pub. Date: Mar. 30, 2006

(65) Prior Publication Data
US 2007/0193469 A1 Aug. 23, 2007

(30) Foreign Application Priority Data
Sep. 24, 2004 (DE) .................. 10 2004 047 275

(51) Int. Cl.
*B60L 13/00* (2006.01)
(52) U.S. Cl. .................................. 104/286
(58) Field of Classification Search ............... 104/281, 104/282, 284, 286, 290, 292, 294; 310/14, 310/22, 21, 12.01, 12.09, 12.15, 13, 12.24, 310/12.25, 12.26
See application file for complete search history.

(56) References Cited
U.S. PATENT DOCUMENTS

| 4,636,667 | A | 1/1987 | Holzinger et al. |
| 4,638,192 | A | 1/1987 | Von der Heide |
| 5,744,879 | A | 4/1998 | Stoiber |
| 2001/0002507 | A1 | 6/2001 | Miller et al. |
| 2004/0007921 | A1 | 1/2004 | Harned |
| 2004/0217659 | A1* | 11/2004 | Godkin ...................... 310/12 |

FOREIGN PATENT DOCUMENTS

| DE | 30 41 940 A1 | 6/1981 |
| DE | 31 49 214 C2 | 5/1993 |
| DE | 195 28 043 C1 | 10/1996 |
| DE | 197 03 497 A1 | 8/1997 |
| EP | 0 156 013 A2 | 10/1985 |
| JP | 2000 152599 | 5/2000 |
| WO | WO 02/23702 A1 | 3/2002 |

* cited by examiner

*Primary Examiner*—Mark T Le
(74) *Attorney, Agent, or Firm*—Harness, Dickey & Pierce, P.L.C.

(57) ABSTRACT

An aim of at least one embodiment of the invention is to reduce ripple forces in a magnetic levitation transport system to the largest extent. In one solution, an example embodiment of the invention provides that grooves extending transversal to the longitudinal direction are diagonally oriented in a magnet block for the long stator. In another solution, an example embodiment of the invention provides that, in a magnet block for the levitation magnet of a magnetic levitation transport system, pole heads, with regard to their outer areas, which extend next to outer grooves, are provided in a varied and complementary manner in the direction of the grooves whereby the overall width of both outer areas along the grooves always corresponds to the width of a tooth between the grooves. An embodiment of the invention also relates to a method for producing this magnet block.

6 Claims, 1 Drawing Sheet

MAGNET BLOCK FOR A MAGNETIC LEVITATION TRANSPORT SYSTEM AND METHOD FOR THE PRODUCTION THEREOF

PRIORITY STATEMENT

This application is the national phase under 35 U.S.C. §371 of PCT International Application No. PCT/EP2005/054640 which has an International filing date of Sep. 19, 2005, which designated the United States of America and which claims priority on German Patent Application number 10 2004 047 275.0 filed Sep. 24, 2004, the entire contents of which are hereby incorporated herein by reference.

BACKGROUND

German Laid-Open Specification DE 30 41 940 A1, for example, discloses a combined supporting, drive and electrical power transmission device for a magnetic levitation railroad vehicle. This device has an elongated stator which is laid along a route and is equipped with a magnet core with a multiplicity of parallel slots which follow one another in the route longitudinal direction and run transversely with respect to the route longitudinal direction; a three-phase AC winding is inserted into the slots. The magnet core and the AC winding of the elongated stator cannot be produced integrally owing to their length, but are composed of individual magnet blocks which are arranged one behind the other, abutting against one another, along the route. The elongated stator has an associated supporting magnet of a magnetic levitation railroad vehicle, which is intended to be moved along the route formed by the elongated stator. The supporting magnet is likewise composed of individual magnet blocks, which have pole heads with slots for holding windings of a linear generator, which is used to supply power to the magnetic levitation railroad vehicle, by inductive means.

It is known that considerable ripple forces occur because of gaps between the individual magnet blocks of the elongated stator on the one hand and gaps between the pole heads of the supporting magnet, as well as a result of the slots in the elongated stator and the slots in the pole heads of the supporting magnet, that is to say fluctuations of the attraction forces between the elongated stator and the supporting magnet. These ripple forces are countered by mismatching the pole heads of the supporting magnet with respect to one another by an integer multiple of the tooth pitch of the elongated stator, which results from the slots. The so-called slot-frequency ripple forces are largely compensated for in this way, seen over the entire supporting magnet.

SUMMARY

At least one embodiment of the invention reduces ripple forces even further.

According to at least one embodiment of the invention, a magnet block for a magnetic levitation railroad system includes an elongated stator, which has first magnet blocks, and having a supporting magnet, which is composed of second magnet blocks and has a plurality of parallel slots in pole heads in order to hold windings of a linear generator, with each first magnet block having a plurality of parallel slots which run transversely and inclined with respect to the longitudinal direction of each first magnet block, separated by a slot pitch, and with the slots in the pole heads running inclined corresponding to the slots in the first magnet blocks.

Specifically, at least one embodiment of the invention is based on the discovery that additional ripple forces result from edge effects of the magnetic fields and also from the fact that the point at which the total force originating from a pole head acts changes its position in the direction of travel. These additional ripple forces are considerably reduced by the oblique profile of the slots provided according to the invention in the magnet blocks of the elongated stator, with appropriate inclination of the slots in the linear generator preventing any adverse effect on the electrical power supply to the magnetic levitation railroad vehicle. Thus, according to the invention, the ripple forces of the individual pole heads themselves are reduced.

A further solution to the problem mentioned above for a magnet block for a magnetic levitation railroad system having an elongated stator which has first magnet blocks and having a supporting magnet which is composed of second magnet blocks and has a plurality of parallel slots in pole heads for holding windings of a linear generator, with each pole head in each case having a tooth located between each of the parallel slots and having outer areas which extend along the outer slots, is, according to the invention, that the outer areas of each pole head have a width which varies in the direction of the slots and are designed to be complementary, in such a manner that the overall width of the two outer areas along the slots always corresponds to the width of a tooth.

One major advantage of this magnet block according to at least one embodiment of the invention is that this makes it possible to produce a magnetic levitation railroad system having an elongated stator and a supporting magnet, in which the additional ripple forces are greatly reduced. In this case, this is achieved with advantageously little complexity solely by a change in the width of the outer area of the pole heads of the supporting magnet; the elongated stator and the linear generator can remain unchanged from the known embodiment.

In the magnet block according to at least one embodiment of the invention, the widths of the outer areas of the pole heads can be varied in different ways. It is important that the width of the outer areas is not constant, as is the case in the prior art. Thus, for example, the width of the outer areas of each pole head can be varied in a complementary sinusoidal form in the direction of the slots.

However, it is considered to be particularly advantageous for the outer areas of the pole heads to be provided with a continuous incline in order to vary their width. This is particularly advantageous because such inclined outer areas can be produced relatively easily.

A corresponding situation applies to a further refinement of the magnet block according to at least one embodiment of the invention, in which the outer areas of the pole heads are inclined in a V-shape in order to vary their width.

At least one embodiment of the invention also relates to a method for production of a magnet block for a supporting magnet, which is composed of magnet blocks, for a magnetic levitation railroad system having a plurality of parallel slots in pole heads for holding windings of a linear generator, with each pole head in each case having a tooth located between each of the parallel slots and having outer areas which extend along the outer slots, and at least one embodiment of the invention provides that in order to form a magnet block with outer areas of each pole head which have a width which varies and are designed to be complementary in such a manner that the overall width of the two outer areas along the slots always corresponds to the width of a tooth, laminates are prestamped with outer areas each having a width which corresponds to a tooth in the pole head area, and are then each successively stamped again using a stamping tool which takes account only of the width of a single tooth for the outer parts, with successive laminates being stamped again, in each case with a lateral offset, in order to form the magnet block.

This method is advantageous in particular because a magnet block with a relatively complicated design can be produced in a relatively simple manner, in two stamping steps, for the supporting magnet of a magnetic levitation railroad system, from laminates, using simple stamping tools.

BRIEF DESCRIPTION OF THE DRAWINGS

The present invention will be described in more detail below by using example embodiments, which will be explained with the aid of the drawings, in which.

DETAILED DESCRIPTION OF THE EXAMPLE EMBODIMENTS

Figure 1:
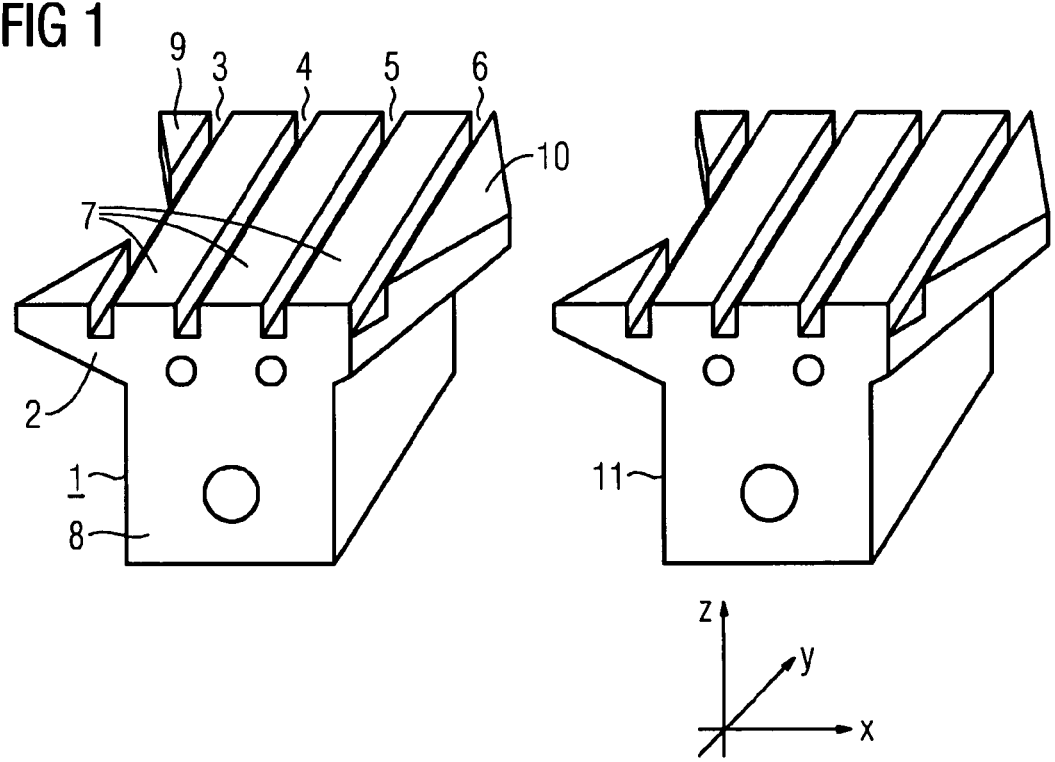
FIG. 1 shows a perspective illustration of a pole head of one exemplary embodiment of the magnet block according to an embodiment of the invention for a supporting magnet.

As can be seen from FIG. 1, a pole piece 1 of a further magnet block, which is not illustrated, of a supporting magnet is provided in the area of its pole head 2 with slots 3, 4, 5 and 6, between which teeth 7 with a width a are located. These slots 3 to 6 lie in the Y-direction of the coordinate system which is likewise illustrated in FIG. 1, and thus transversely with respect to the X-direction, which indicates the route direction of a magnetic levitation railroad that is equipped with the illustrated elements, or the longitudinal direction of the supporting magnet. A limb 8 is connected to the pole piece 1 in the downward direction, around which a DC winding is placed, as a field winding, in the completely assembled state.

As FIG. 1 also shows, the pole head 2 is in each case inclined in a V-shape in the respective outer area 9 or 10 extending along the slots 3 to 6. In this case, the incline in the outer area 9 is concave, and that in the outer area 10 is convex. This complementary shape ensures that the overall width of the area of the pole head 2 has a constant magnitude, which allows a further pole piece 11, as is illustrated in FIG. 1, of the same design to be connected in a matching form to the first pole piece 1 in order in this way to form a magnet block with a plurality of pole pieces and limbs adjacent to them, as is required as part of the supporting magnet in a magnetic levitation railroad system.

Figure 2:
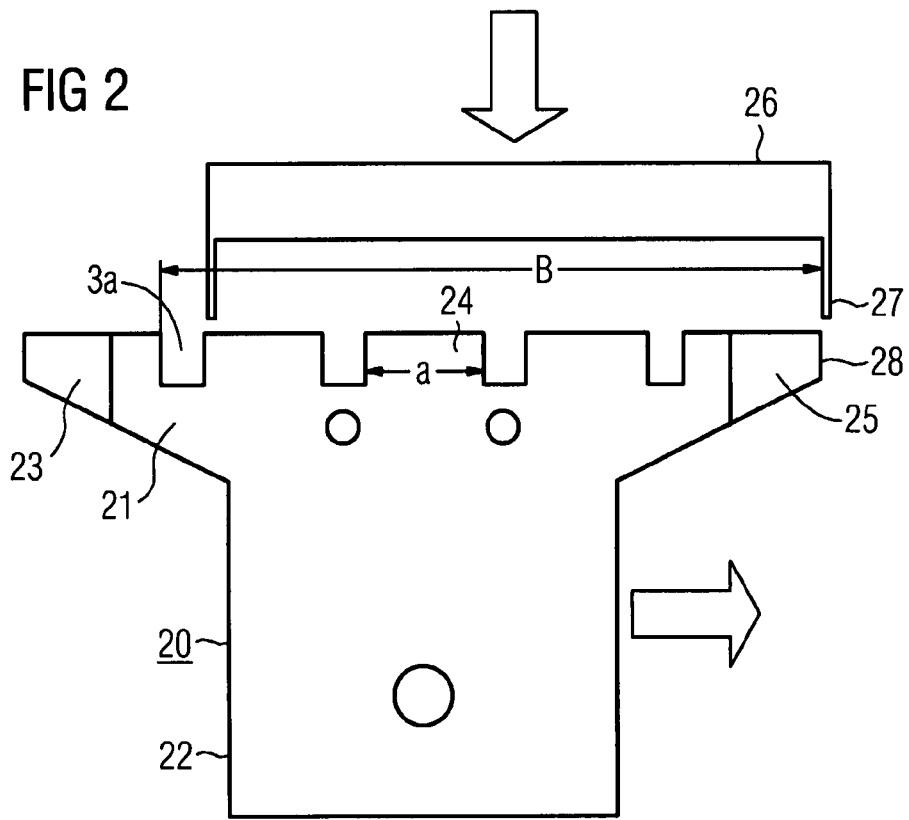
FIG. 2 shows the processing of a laminate in order to produce a pole head such as this.

FIG. 2 shows a laminate 20 as it appears after a first stamping process in order to produce a magnet block for the supporting magnet according to an embodiment of the invention, with an area 21 in order to form a pole head and a limb 22 for holding windings. In this case, in the area 21, the laminate 20 has a width B which is greater in total by the width a of a tooth part 24 than is required for pole pieces of known supporting magnets; this width results from the fact that, like a further outer part 25, the outer part 23 is larger by half of the width a of the tooth part 24.

After the first laminate cut or stamping step, the laminate 20 is stamped again by way of a second cutting tool 26, which provides the laminate 20 with the final width in the area 21 in order to form the pole head. The different configuration of the individual laminates 20 in the area 21, and thus an incline in the outer area 9 or 10 of the pole head 2 (see FIG. 1) are in this case achieved by the laminates 20 which form the pole head 1 being shifted laterally successively for stamping again, with the laminate 20 in each case being moved by a predetermined step width relative to the cutting position of the tool 26. In the illustrated position, the subsequent stamping process results in a laminate 20 which forms the pole head with an adjacent limb approximately at half the length of the slots 3 to 6. If a laminate piece 20 is located in a position relative to the position of the cutting tool 26 in which the right-hand edge 27 of the cutting tool 26 is located above the position 28, then this results in a laminate 20 which can be used at the ends of the slots 3 and 6.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A magnet block in an elongated stator of a magnetic levitation railroad system, the magnetic block comprising:
    a pole piece having a pole head and a limb;
    the pole head including a plurality of parallel slots for holding windings of a linear generator, a tooth located between each adjacent pair of the parallel slots, and two outer areas extending along the outer ones of the slots, each of the outer areas including a width that varies in direction of the slots and being configured to be complementary to the other one of the outer areas in such a manner that an overall width of the two outer areas along the slots always corresponds to a width of the tooth.

2. The magnet block as claimed in claim 1, wherein each of the outer areas of the pole head is provided with a continuous upward incline from the limb to an outer edge of the outer area.

3. The magnet block as claimed in claim 1, wherein, each of the outer areas of the pole head varies in width in a direction parallel to the slots so as to form a V-shape.

4. The magnet block as claimed in claim 1, wherein the slots lie in a direction transverse to a route direction of the magnetic levitation railroad system.

5. The magnet block as claimed in claim 1, wherein the outer areas form sidewalls of two outer slots, and at least one of the two slots has an incomplete sidewall.

6. A method for production of a magnet block for a supporting magnet including magnet blocks, for a magnetic levitation railroad system, the magnetic block including a plurality of parallel slots in a pole head for holding windings of a linear generator, the pole head including a tooth located between each adjacent pair of the parallel slots and two outer areas that extend along outer ones of the slots, the method comprising:
    forming prestamped laminates of the magnet block with each of the outer areas of the pole head including a width that varies and complementary to a width of the other one of the outer areas in such a manner that an overall width of the outer areas along the slots always corresponds to a width of the tooth; and
    wherein, the step of forming the laminates including stamping the laminates by laterally shifting each successive laminate by a predetermined step width relative to a cutting position of a stamping tool so as to form the outer areas with the varied and complementary widths.

* * * * *